(12) United States Patent
Chen (10) Patent No.: US 9,944,225 B1
(45) Date of Patent: Apr. 17, 2018

(54) STEP ASSEMBLY FOR A TRUCK (71) Applicant: Shu-Ling Chen, Tainan (TW)

(72) Inventor: Shu-Ling Chen, Tainan (TW)

(*) Notice: Subject to any disclaimer, the term of this patent is extended or adjusted under 35 U.S.C. 154(b) by 4 days.

(21) Appl. No.: 15/472,947

(22) Filed: Mar. 29, 2017

(51) Int. Cl.
*B60R 3/00* (2006.01)
*B60Q 1/26* (2006.01)
*B60R 3/02* (2006.01)
B60R 11/04 (2006.01)
B60R 11/00 (2006.01)

(52) U.S. Cl.
CPC ......... *B60Q 1/2661* (2013.01); *B60Q 1/2696* (2013.01); *B60R 3/002* (2013.01); *B60R 3/02* (2013.01); B60R 11/04 (2013.01); B60R 2011/004 (2013.01)

(58) Field of Classification Search
CPC .... B60Q 1/2661; B60Q 1/2696; B60R 3/002; B60R 3/02; B60R 2011/004; B60R 11/04; B60R 3/00; B60R 3/007; B60R 3/04
See application file for complete search history.

(56) References Cited

U.S. PATENT DOCUMENTS

| | | | | |
|---|---|---|---|---|
| 835,004 A * | 11/1906 | Wilson | ........... | B60R 3/002 280/169 |
| 1,271,979 A * | 7/1918 | Wren | ........... | B60R 3/002 15/237 |
| 2,009,204 A * | 7/1935 | Pryale | ........... | B60R 3/002 280/163 |
| 4,456,275 A * | 6/1984 | Snyder | ........... | B60R 3/002 182/92 |
| 4,463,962 A * | 8/1984 | Snyder | ........... | B60Q 1/323 280/164.1 |
| 4,544,991 A * | 10/1985 | Gorsuch | ........... | B60Q 1/323 280/164.1 |
| 4,557,494 A * | 12/1985 | Elwell | ........... | B60Q 1/323 24/514 |
| 4,733,335 A * | 3/1988 | Serizawa | ........... | B60Q 1/302 362/373 |
| 5,193,829 A * | 3/1993 | Holloway | ........... | B60R 3/002 280/163 |
| 5,430,627 A * | 7/1995 | Nagano | ........... | F21V 15/013 362/146 |
| 5,594,424 A * | 1/1997 | Louy | ........... | B60Q 1/2696 257/E25.028 |
| 5,713,589 A * | 2/1998 | Delgado | ........... | B60R 3/00 182/190 |
| 5,915,830 A * | 6/1999 | Dickson | ........... | B60Q 1/323 362/495 |
| 6,173,979 B1 * | 1/2001 | Bernard | ........... | B60R 3/002 280/163 |
| 6,203,040 B1 * | 3/2001 | Hutchins | ........... | B60R 3/002 182/90 |

(Continued)

Primary Examiner — Jacob B Meyer
(74) Attorney, Agent, or Firm — J.C. Patents (57) ABSTRACT

A step assembly for a truck includes a plurality of bases, lamps, upper rods, lower rods, at least one front rod(s), at least one rear rod(s) and two side covers as main components combined together. The step assembly uses a special base which can be hidden to make the light inside the step assembly be revealed from the gaps or hole(s) of the upper rods, lower rods, front rod(s) and rear rod(s). So that the step assembly can show its three-dimensional structure at night or in the dark room, to facilitate the user to identify the position of the step assembly.

20 Claims, 8 Drawing Sheets

(56) References Cited

U.S. PATENT DOCUMENTS

| | | | | |
|---|---|---|---|---|
| 6,382,819 B1* | 5/2002 | McQuiston | B60Q 1/323 | 362/487 |
| 6,588,782 B2* | 7/2003 | Coomber | B60R 3/002 | 280/163 |
| 6,641,290 B2* | 11/2003 | Ishiharada | B60K 37/02 | 362/495 |
| 6,709,137 B1* | 3/2004 | Glovak | B60Q 1/323 | 362/495 |
| 6,971,758 B2* | 12/2005 | Inui | G02B 6/0018 | 362/23.01 |
| 7,025,481 B2* | 4/2006 | Moll | B60Q 1/32 | 362/225 |
| 8,702,284 B2* | 4/2014 | Huang-Tsai | B60Q 1/323 | 362/249.02 |
| 9,022,631 B2* | 5/2015 | Mulder | G02B 6/006 | 362/601 |
| 9,096,176 B2 | 8/2015 | Muhe-Sturm | A62C 27/00 | |
| 9,290,129 B1* | 3/2016 | Wurzer | B60R 3/04 | |
| 9,409,520 B1* | 8/2016 | Wang | B60R 3/002 | |
| 9,499,093 B1* | 11/2016 | Salter | B60Q 1/323 | |
| 9,539,937 B2* | 1/2017 | Dellock | B60Q 1/323 | |
| 9,586,527 B1* | 3/2017 | Salter | B60R 3/02 | |
| 9,598,004 B2* | 3/2017 | Yang | B60Q 1/323 | |
| 9,751,458 B1* | 9/2017 | Dellock | B60Q 1/2619 | |
| 9,758,090 B1* | 9/2017 | Salter | B60Q 1/323 | |
| 2002/0054494 A1* | 5/2002 | Ishiharada | B60K 37/02 | 362/487 |
| 2003/0006576 A1* | 1/2003 | Lanoue | B60R 3/002 | 280/163 |
| 2005/0012295 A1* | 1/2005 | Chevalier | B60R 3/002 | 280/163 |
| 2005/0213351 A1* | 9/2005 | Yang | B60Q 1/323 | 362/633 |
| 2005/0263974 A1* | 12/2005 | Mulder | B60R 3/00 | 280/163 |
| 2006/0114685 A1* | 6/2006 | Seeber | B60Q 1/323 | 362/495 |
| 2007/0296175 A1* | 12/2007 | Flajnik | B60R 3/002 | 280/169 |
| 2008/0018074 A1* | 1/2008 | Steffens | B60R 3/00 | 280/163 |
| 2008/0037266 A1* | 2/2008 | Cunnien | B60Q 1/323 | 362/495 |
| 2008/0084704 A1* | 4/2008 | Kobayashi | B60Q 1/2661 | 362/495 |
| 2008/0253140 A1* | 10/2008 | Fleischmann | B60Q 1/2696 | 362/487 |
| 2009/0121449 A1* | 5/2009 | Kuntze | B60R 3/00 | 280/163 |
| 2009/0200966 A1* | 8/2009 | Whitehouse | A47B 97/00 | 315/309 |
| 2010/0186214 A1* | 7/2010 | Judge | B60Q 1/2696 | 29/445 |
| 2010/0244397 A1* | 9/2010 | Huang-Tsai | B60R 3/00 | 280/163 |
| 2011/0266766 A1* | 11/2011 | Huang-Tsai | B60R 3/00 | 280/169 |
| 2012/0092889 A1* | 4/2012 | Held | B60Q 1/26 | 362/606 |
| 2013/0201714 A1* | 8/2013 | Huang-Tsai | B60Q 1/323 | 362/545 |
| 2013/0335994 A1* | 12/2013 | Mulder | F21V 9/00 | 362/555 |
| 2014/0119038 A1* | 5/2014 | Mulder | G09F 13/06 | 362/509 |
| 2014/0184068 A1* | 7/2014 | Kwon | B60Q 1/2603 | 315/80 |
| 2014/0291957 A1* | 10/2014 | Muhe-Sturm | A62C 27/00 | 280/163 |
| 2015/0175079 A1* | 6/2015 | Kmita | B60R 3/007 | 280/166 |
| 2015/0226403 A1* | 8/2015 | Dellock | B60Q 1/2611 | 362/510 |
| 2016/0059786 A1* | 3/2016 | Montoya | B60R 3/002 | 280/163 |
| 2016/0059811 A1* | 3/2016 | Vermeys | B60R 19/42 | 293/128 |
| 2016/0121785 A1* | 5/2016 | Wang | B60Q 1/323 | 362/511 |
| 2016/0219708 A1* | 7/2016 | Aiso | H05K 3/105 | |
| 2016/0236613 A1* | 8/2016 | Trier | B60R 13/04 | |
| 2017/0036596 A1* | 2/2017 | Yang | B60Q 1/323 | |
| 2017/0106918 A1* | 4/2017 | Diller | B60R 3/002 | |
| 2017/0157817 A1* | 6/2017 | Lee | B29C 45/14 | |

* cited by examiner

FIG 11

STEP ASSEMBLY FOR A TRUCK

BACKGROUND OF THE INVENTION

1. Field of the Invention

This invention relates to a step assembly for a truck, particularly to a step assembly has lamps therein, so that the step assembly can be shown at night or in the dark room.

2. Description of the Prior Art

At present, the step (such as a rear step or side step) of a truck (such as a pickup truck) can be divided into a foldable step, a pull-out step and a fixed step, and the color of such steps is designed to match the color of the car. However, in the night or dark room, the user is not easy to see the position of such truck steps, so that it is prone to occurred accident that the user steps on the wrong step or hits the step.

For this reason, the inventor of this invention, having much experience in designing and manufacturing truck steps and its related products, understands and researches the problem of the foregoing truck steps and hence devised this invention.

SUMMARY OF THE INVENTION

The objective of this invention is to offer a step assembly for a truck, the step assembly used a special base which can be hidden and the rods with a plurality of gaps or holes, to make the light inside the step assembly can be revealed from the gaps or holes of the upper rods, lower rods, front rod(s) and rear rod(s). So that, the step assembly can show its three-dimensional structure at night or in the dark room, to facilitate the user to identify the position of the step assembly. Moreover, the light of step assembly will not directly shine to the outside to ensure the safety of other road users, to achieve the effect of increase step assembly safety and visual beauty at night.

The step assembly for a truck in the present invention includes a plurality of bases, lamps, upper rods, lower rods, at least one front rod(s), at least one rear rod(s) and two side cover as main components combined together. Said base have a lamp support and a plurality of lamps are arranged thereon; a first socket is set above the lamp support, the first socket has a plurality of first connecting parts and each first connecting part is spaced from each other; a second socket is set below the lamp support, the second socket has a plurality of second connecting parts and each second connecting part is spaced from each other; a third socket is set in front of the lamp support, the third socket has at least one third connecting parts; a fourth socket is set behind the lamp support, the fourth socket has at least one fourth connecting parts. The upper rods are combined with the corresponding first connecting part, the lower rod are combined with the corresponding second connecting part, the front rod is combined with the corresponding third connecting part, the rear rod is combined with the corresponding fourth connecting part. said upper rods, lower rods, front rod(s) and rear rod(s) form a space therebetween, and the position of the space corresponds to the location of the lamp support of base, the lamps on the lamp support illuminate the space and the light is revealed from the gap(s) or hole(s) of the rods.

The step assembly for a truck of present invention, among which said first connecting part is a protruding structure and said upper rods is a bending stereo-structure, so that the bases are hidden below the upper rods and the gap(s) between the upper rods 3 is not shielded by the base.

The step assembly for a truck of present invention, among which the step assembly is provide with a connecting member, the connecting member 8 has a first linkage part 81 and a second linkage part which are used to link the truck and the step assembly respectively, said second linkage part is provided with a support plate which is engageable with said lower rods. Moreover, said connecting member can be a foldable structure or a pull-out structure.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of step assembly for a truck in the present invention, as shown in FIG. 1~5, includes a plurality of bases 1, lamps 2, upper rods 3, lower rods 4, at least one front rod(s) 5, at least one rear rod(s) 6 and two side cover 7 as main components combined together.

Said base 1 is provided with a lamp support 10 for arranging the lamps 2, the lamp 2 may be the LED lamp, tungsten lamp or other lamp.

A first socket 11 is set above the lamp support 10, the first socket 11 has a plurality of first connecting parts 110 and each first connecting part 110 is spaced from each other. The first connecting part 110 may be a protruding structure (such as T-shaped protruding structure, rhombic protruding structure, or arcuate protruding structure) or a through hole. As shown in FIGS. 1, 3, 4 and 9, the bases 1 are hidden below the upper rods 3 so that the gaps between the upper rods 3 are not shielded by the base 1 and to make the upper rods 3 have an integrated visual beauty when the first connecting parts 11 are protruding structure.

A second socket 12 is set below the lamp support 10, the second socket 12 has a plurality of second connecting parts 120 and each second connecting part 120 is spaced from each other. The second connecting part 120 also may be a protruding structure (such as T-shaped protruding structure, rhombic protruding structure, or arcuate protruding structure) or a through hole.

A third socket 13 is set in front of the lamp support 10, the third socket 13 has at least one third connecting parts 130 and each third connecting part 130 is spaced from each other. The third connecting part 130 also may be a protruding structure (such as T-shaped protruding structure, rhombic protruding structure, or arcuate protruding structure) or a through hole.

A fourth socket 14 is set behind the lamp support 10, the fourth socket 14 has at least one fourth connecting parts 140 and each fourth connecting part 140 is spaced from each other. The fourth connecting part 140 also may be a protruding structure (such as T-shaped protruding structure, rhombic protruding structure, or arcuate protruding structure) or a through hole.

The shape of said upper rod 3 is in accordance with the shape of the first connecting part 110 of the base 1, each upper rod 3 is combined with the corresponding first connecting part 110 and at least one gap(s) 30 is formed between adjacent upper rods 3. An anti-slip member can be arranged on the rod 3.

The shape of said lower rod 4 is in accordance with the shape of the second connecting part 120 of the base 1, each lower rod 4 is combined with the corresponding second connecting part 120 and at least one gap(s) 40 is formed between adjacent lower rod 4 for discharging outside the things that fell into the step assembly.

Figure 10:
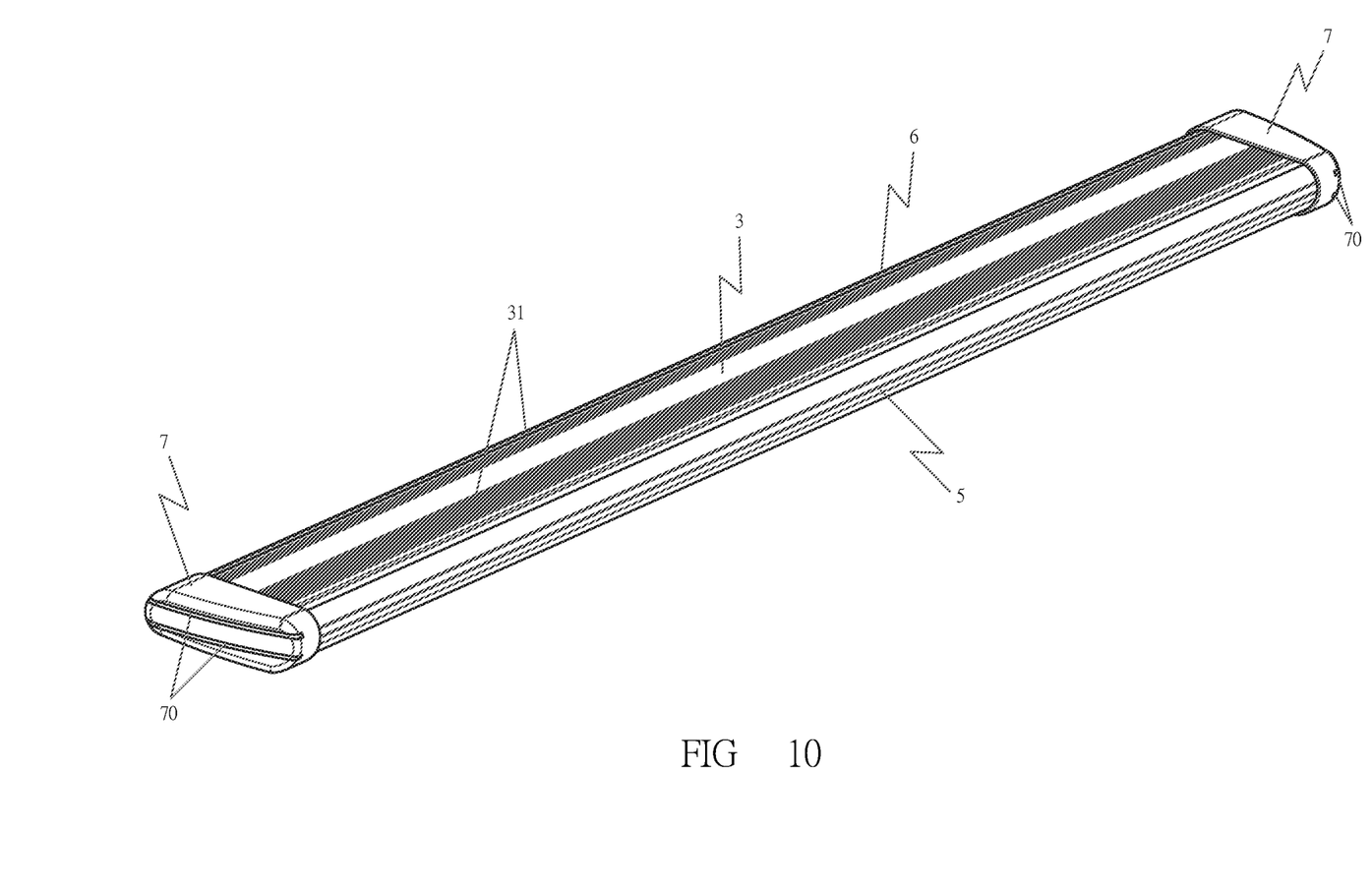
FIG. 10 is a three-dimensional view of the second embodiment of the step assembly in the present invention.
Figure 11:
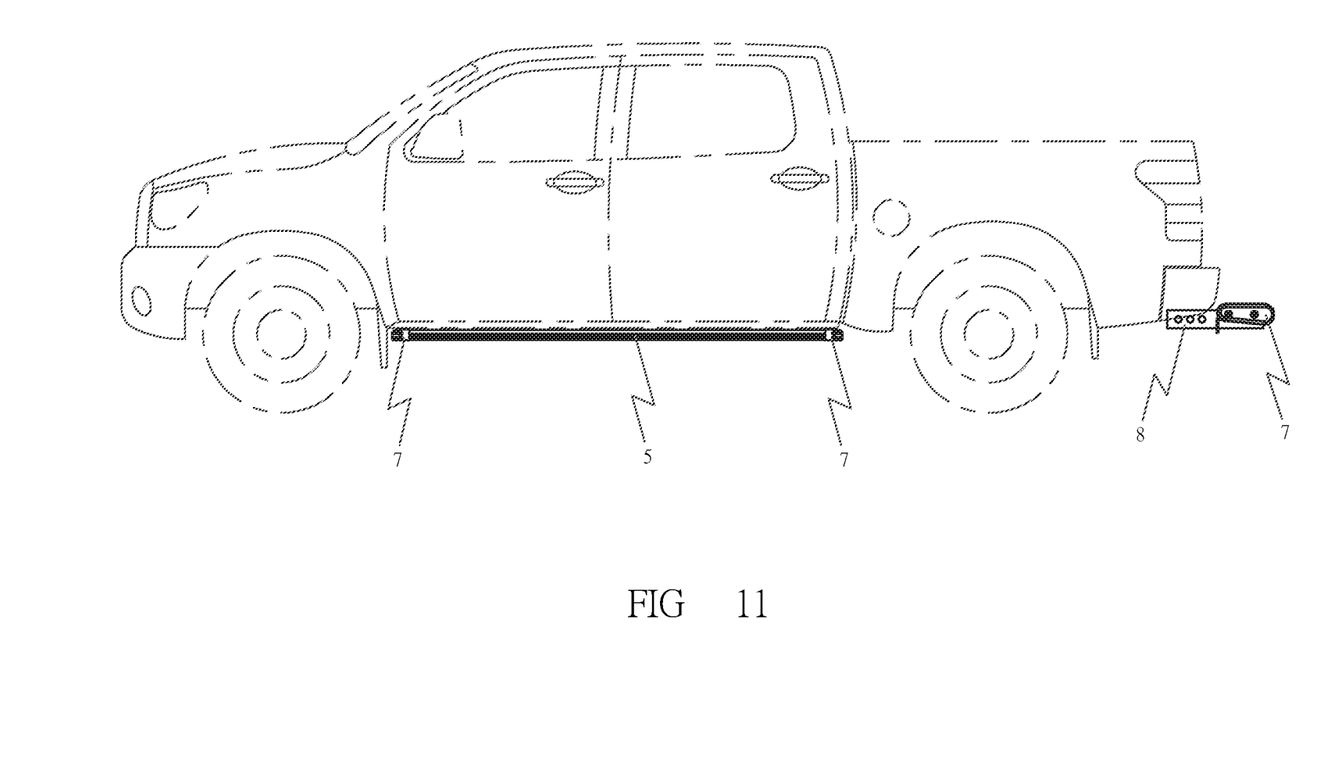
FIG. 11 is an application example of the step assembly in the present invention.

The shape of said front rod 5 is in accordance with the shape of the third connecting part 130 of the base 1, each front rod 5 is combined with the corresponding third connecting part 130. The front rod 5 may be provided with various electronic device 50 such as reversing radar, camera, antenna, or signal receiver. The shape of said rear rod 6 is in accordance with the shape of the fourth connecting part 140 of the base 1, each rear rod 6 is combined with the corresponding fourth connecting part 140. The hole(s) can be set on the front rod 5 when the front rod 5 is only one, and the hole(s) can be set on the rear rod 6 when the rear rod 6 is only one. At least one gap is formed between adjacent front rods 5 when the front rod 5 has more than one (as shown in FIGS. 10), and at least one gap is formed between adjacent rear rod 6 when the rear rod 6 has more than one.

Said upper rods 3, lower rods 4, front rod(s) 5 and rear rod(s) 6 form a space D therebetween, and the position of the space D corresponds to the location of the lamp support 10 of base 1, so that the lamps 2 on the lamp support 10 can illuminate the space D and the light will be revealed from the gaps or hole(s) of the rods 3、4、5、6. The space D also has the effect of hiding electronic equipment.

Figure 1:
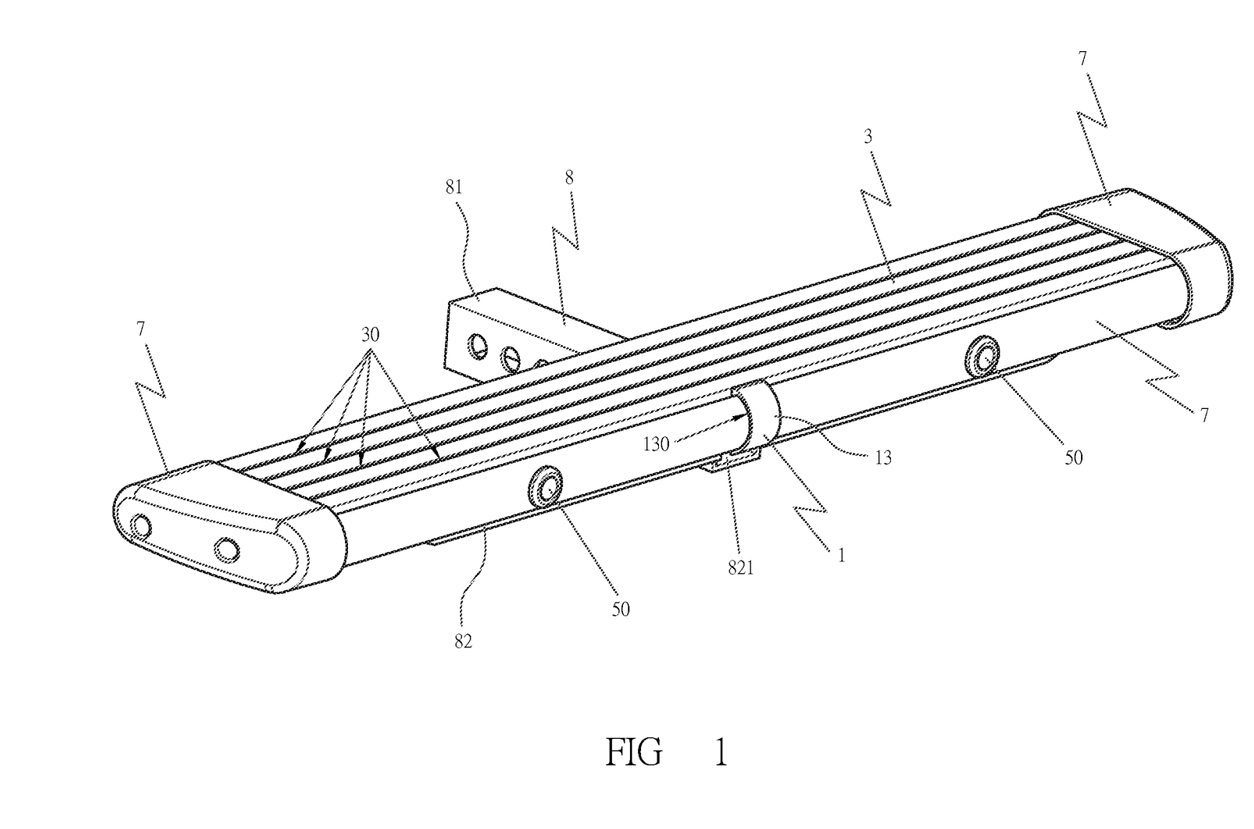
FIG. 1 is a three-dimensional view of the first embodiment of the step assembly in the present invention.
Figure 2:
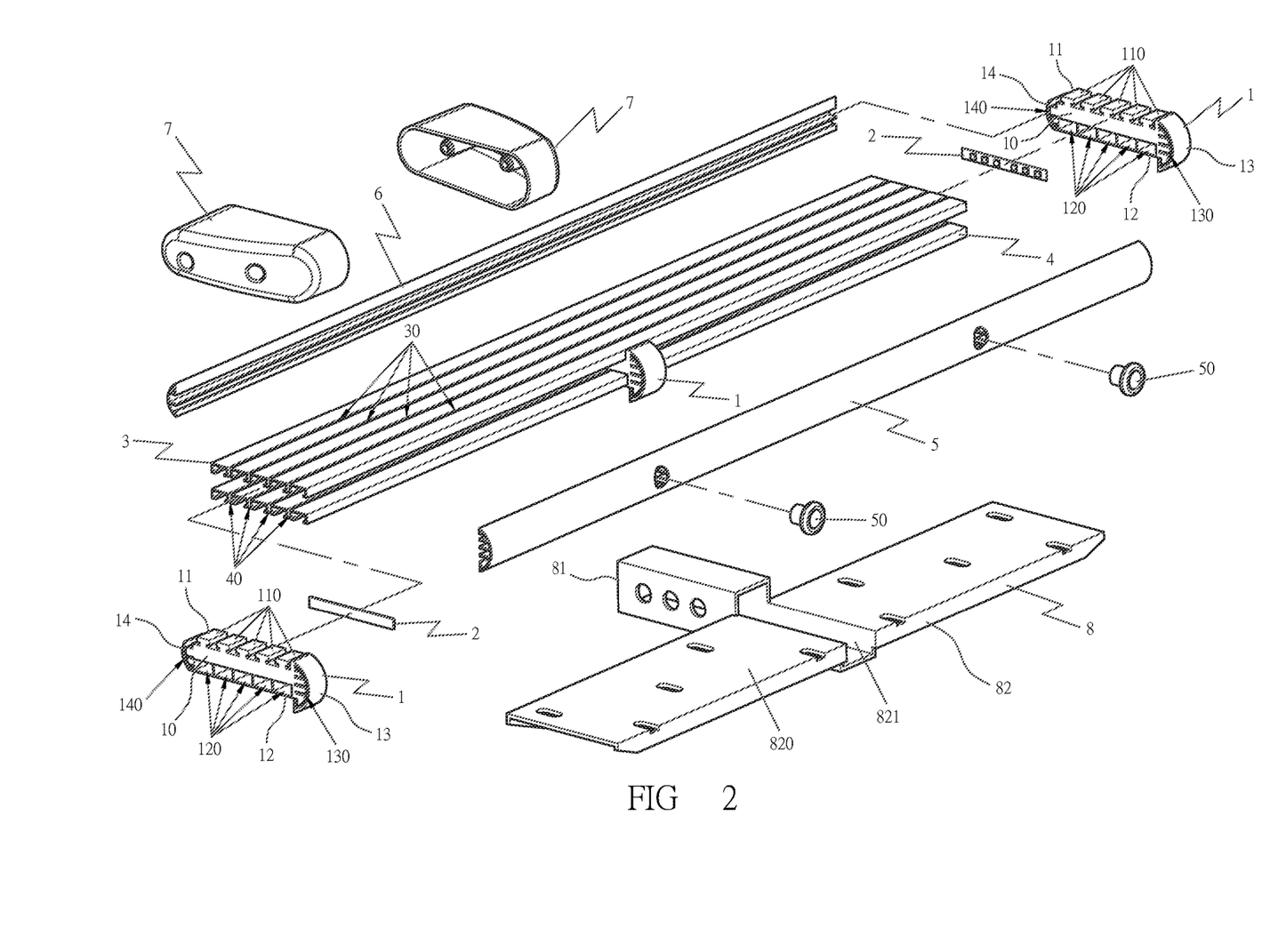
FIG. 2 is an exploded perspective view of the first embodiment of the step assembly in the present invention.
Figure 3:
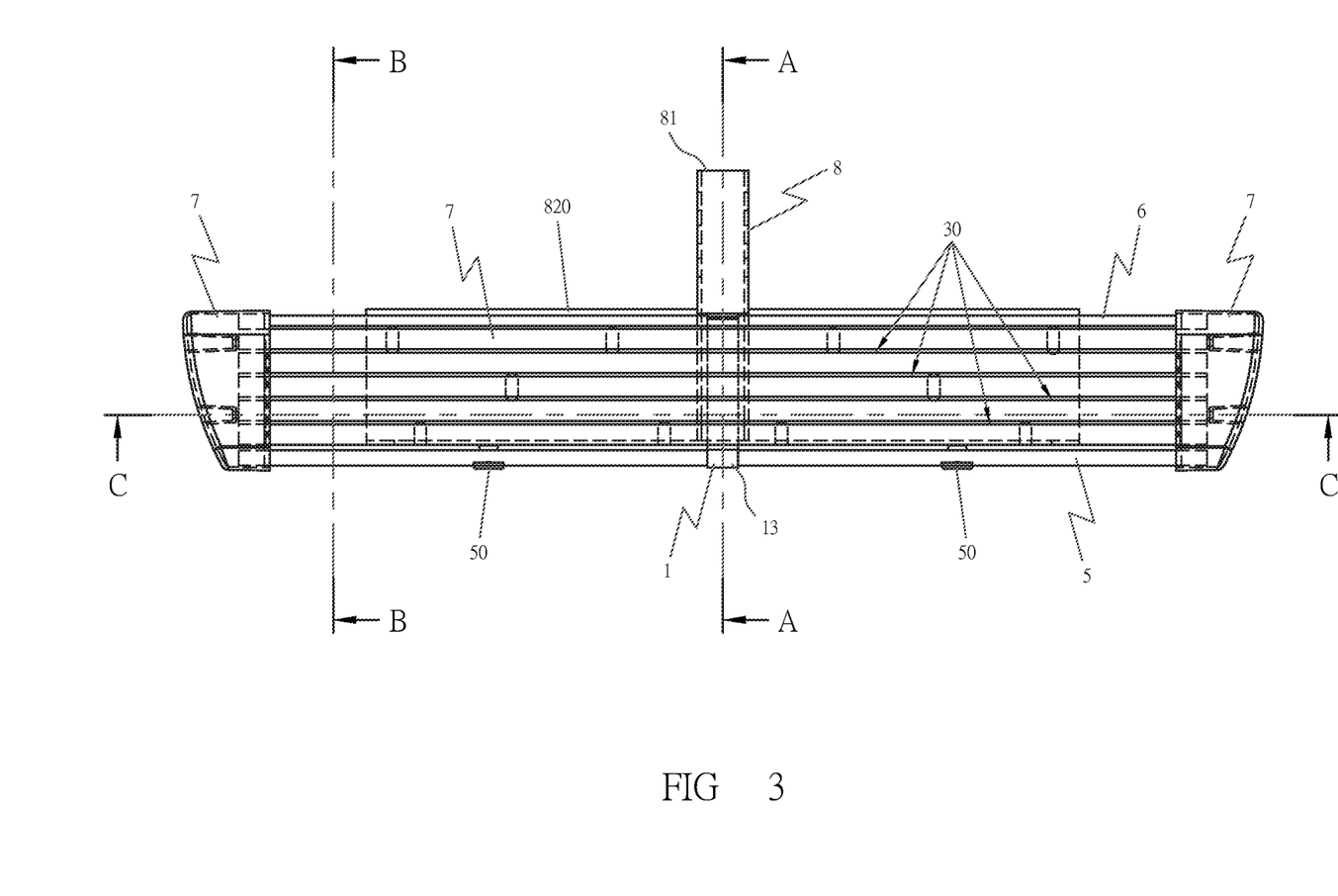
FIG. 3 is a top view of the first embodiment of the step assembly in the present invention.
Figure 4:
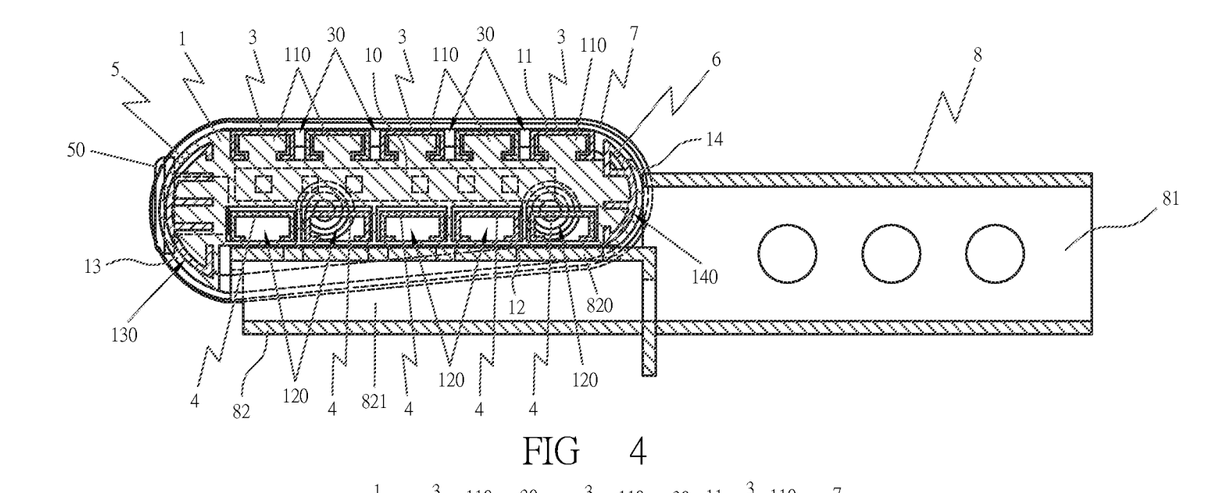
FIG. 4 is an sectional view of A-A shown in FIG. 3.
Figure 5:
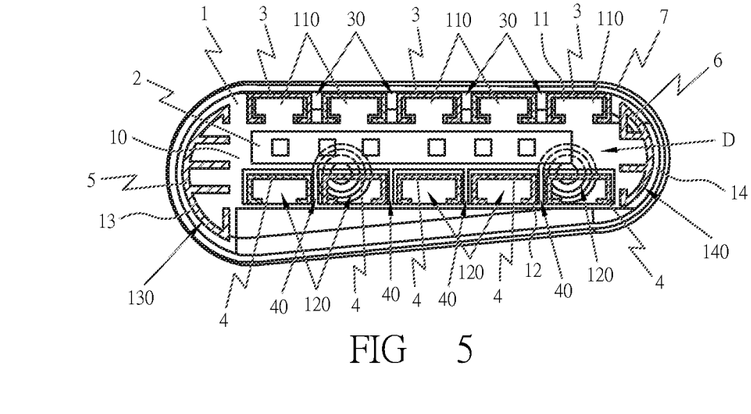
FIG. 5 is an sectional view of B-B shown in FIG. 3.
Figure 6:
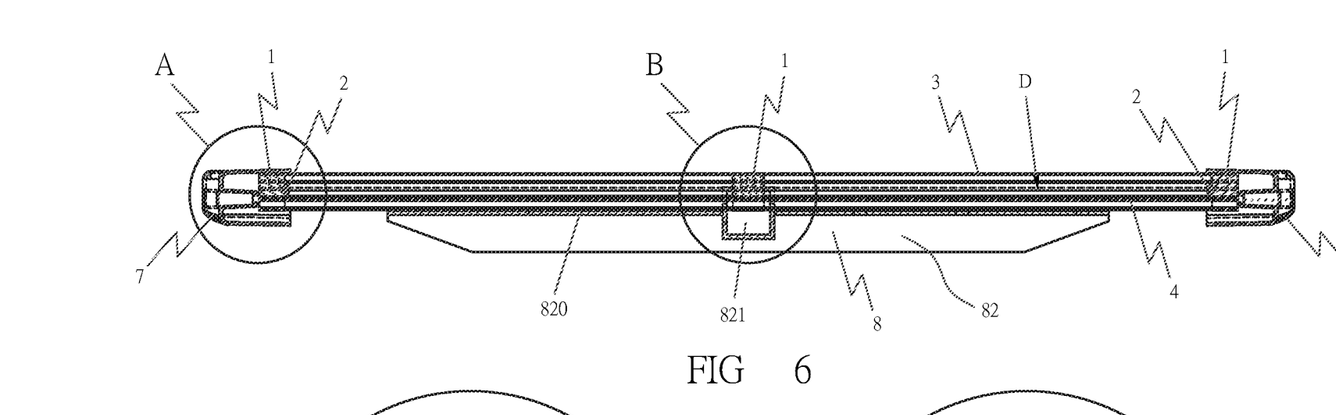
FIG. 6 is an sectional view of C-C shown in FIG. 3.
Figure 7:
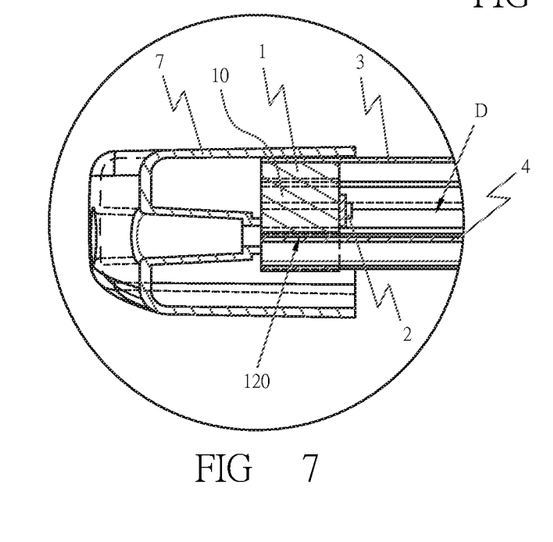
FIG. 7 is an enlarged view of area A shown in FIG. 6.
Figure 8:
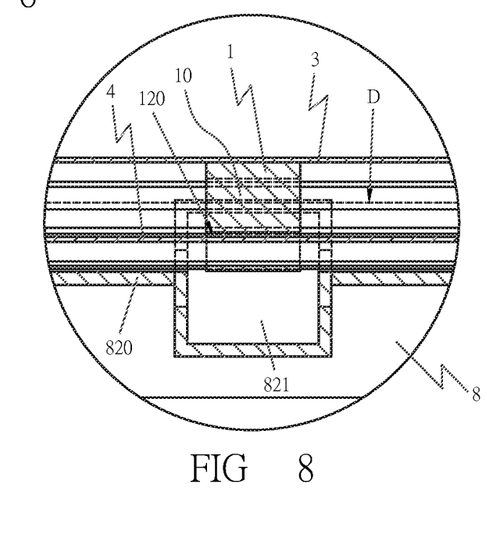
FIG. 8 is an enlarged view of area B shown in FIG. 6.
Figure 9:
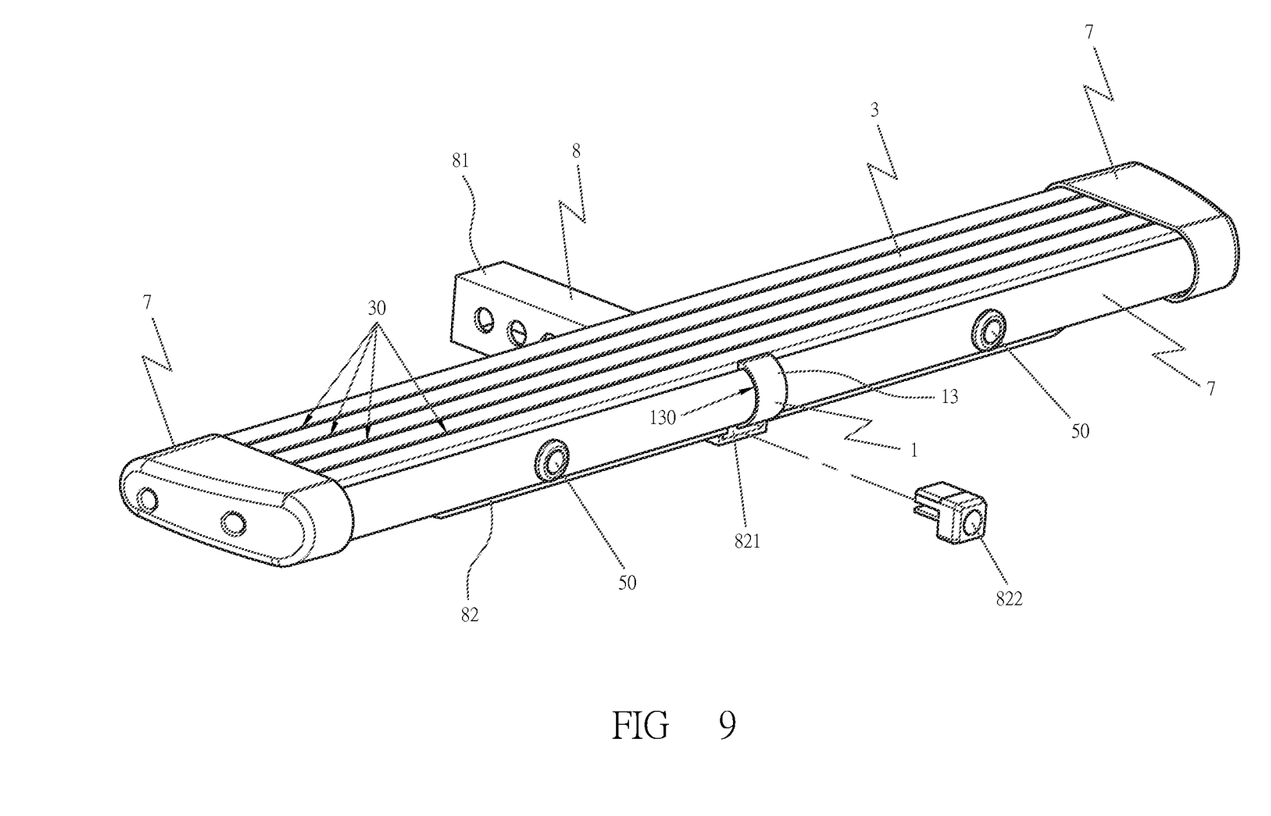
FIG. 9 is a three-dimensional view of the first embodiment of the step assembly in the present invention.

As shown in FIGS. 2, Said upper rods 3, lower rods 4, front rod(s) 5 and rear rod(s) 6 may be a bending stereo-structure to increase the flexural strength of the rods, when the first connecting part 110, second connecting part 120, third connecting part 130 and fourth connecting part 140 are protruding structures. Each of the upper rods 3, lower rods 4, front rod(s) 5 and rear rod(s) 6 may be provided in a different width and the rods 3、4、5、6 can be made of metal (such as aluminum, iron, steel, etc.), plastic, light-transmitting materials (such as acrylic, etc.), wood and other materials.

Said two side covers 7 are provided on both sides of the step assembly for combining the bases 1, lamps 2, upper rods 3, lower rods 4, front rod 5 and rear rod 6, and the reflectors 70 can be set on the side cover 7.

As shown in FIGS. 1~9 and 11, the step assembly can provide with a connecting member 8 for connecting the step assembly on the truck. The connecting member 8 has a first linkage part 81 and a second linkage part 82 which are used to link the truck and the step assembly respectively. Said second linkage part 82 is provided with a support plate 820 which is engageable with said lower rods 4, and a groove 821 is set on the second linkage part 82 for arranging various electronic devices 822 therein, such as a reversing radar, a camera, an antenna, or a signal receiver. Said connecting member 8 can be a foldable structure or a pull-out structure.

Therefore, this invention used a special base which can be hidden and the rods with a plurality of gaps or holes, to make the light inside the step assembly can be revealed from the gaps or hole(s) of the upper rods 3, lower rods 4, front rod(s) 5 and rear rod(s) 6. So that, the step assembly can show its three-dimensional structure at night or in the dark room, to facilitate the user to identify the position of the step assembly. Moreover, the light of step assembly will not directly shine to the outside to ensure the safety of other road users, to achieve the effect of increase step assembly safety and visual beauty at night. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

What is claimed is:

1. A step assembly for a truck at least comprising:
   a plurality of bases are provided inside the step assembly, each base has a lamp support and a plurality of lamps are arranged thereon; a first socket is set above the lamp support, the first socket has a plurality of first connecting parts and each first connecting part is spaced from each other; a second socket is set below the lamp support, the second socket has a plurality of second connecting parts and each second connecting part is spaced from each other; a third socket is set in front of the lamp support, the third socket has at least one third connecting part; a fourth socket is set behind the lamp support, the fourth socket has at least one fourth connecting part;
   a plurality of upper rods are combined with the corresponding first connecting part of the base, the shape of the upper rod is in accordance with the shape of the first connecting part providing at least one gap formed between adjacent upper rods;
   plurality of lower rods are combined with the corresponding second connecting part of the base, the shape of the lower rod is in accordance with the shape of the second connecting part providing at least one gap formed between adjacent lower rods;
   at least one front rod is combined with the corresponding third connecting part of the base, the shape of the front rod is in accordance with the shape of the third connecting part;
   at least one rear rod is combined with the corresponding fourth connecting part of the base, the shape of the rear rod is in accordance with the shape of the fourth connecting part;
   said upper rods, lower rods, front rod(s) and rear rod(s) form a space therebetween, and the position of the space corresponds to the location of the lamp support of base, the lamps on the lamp support illuminate the space and the light is revealed from the gap(s) of the rods; and
   side covers are provided on both sides of the step assembly.

2. The step assembly for a truck according to claim 1, wherein each said first connecting part is a protruding structure and said upper rods are a bending stereo-structure, so that the bases are hidden below the upper rods and the gap(s) between the upper rods are not shielded by the base.

3. The step assembly for a truck according to claim 2, wherein said protruding structure is a T-shaped protruding structure, rhombic protruding structure, or arcuate protruding structure.

4. The step assembly for a truck according to claim 1, wherein each said first connecting part, second connecting part, third connecting part and fourth connecting part are protruding structures, and said upper rods, lower rods, front rod(s) and rear rod(s) are bending stereo-structures, so that the bases are hidden inside the upper rods, lower rods, front rod(s) and rear rod(s).

5. The step assembly for a truck according to claim 4, wherein each said protruding structure is a T-shaped protruding structure, rhombic protruding structure, or arcuate protruding structure.

6. The step assembly for a truck according to claim 1, wherein each said first connecting part, second connecting part, third connecting part and fourth connecting part are through hole.

7. The step assembly for a truck according to claim 1, wherein said third socket and front rod are only one, and the front rod is provided at least one hole.

8. The step assembly for a truck according to claim 1, wherein said fourth connecting part and rear rod are only one, and the rear rod is provided with at least one hole.

9. The step assembly for a truck according to claim 1, wherein said third socket and front rod are more than one, and at least one gap is formed between adjacent front rods.

10. The step assembly for a truck according to claim 1, wherein said fourth connecting parts and rear rod are more than one, and at least one gap is formed between adjacent rear rods.

11. The step assembly for a truck according to claim 1, wherein said lamp is an LED lamp or tungsten lamp.

12. The step assembly for a truck according to claim 1, wherein an anti-slip member is arranged on the upper rods.

13. The step assembly for a truck according to claim 1, wherein said front rod is provided with a reversing radar, camera, antenna, or signal receiver.

14. The step assembly for a truck according to claim 1, wherein at least one reflector is set on said side cover.

15. The step assembly for a truck according to claim 1, wherein the step assembly is provided with a connecting member for connecting the step assembly on the truck.

16. The step assembly for a truck according to claim 15, wherein said connecting member has a first linkage part and a second linkage part which are used to link the truck and the step assembly respectively, said second linkage part is provided with a support plate which is engageable with said lower rods.

17. The step assembly for a truck according to claim 16, wherein said second linkage part is provided with a groove, and and electronic devices arranged therein.

18. The step assembly for a truck according to claim 15, wherein said connecting member is a foldable structure or a pull-out structure.

19. The step assembly for a truck according to claim 1, wherein said upper rods, lower rods, front rod(s) and rear rod(s) are made of metal, plastic, light-transmitting materials or wood.

20. The step assembly for a truck according to claim 1, wherein said upper rods, lower rods, front rod(s) and rear rod(s) are made of light-transmitting materials.

* * * * *